Patented Aug. 2, 1927.

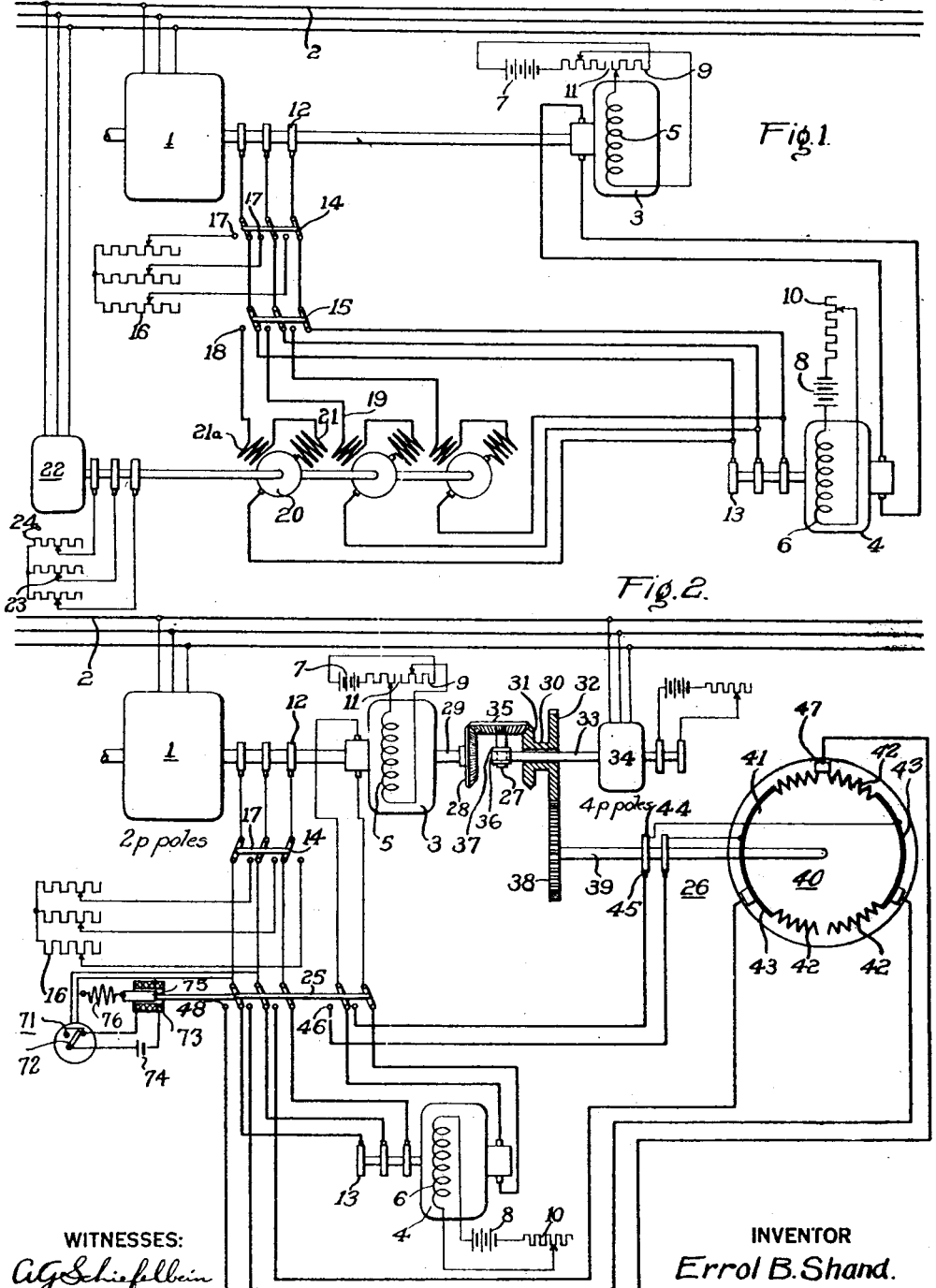

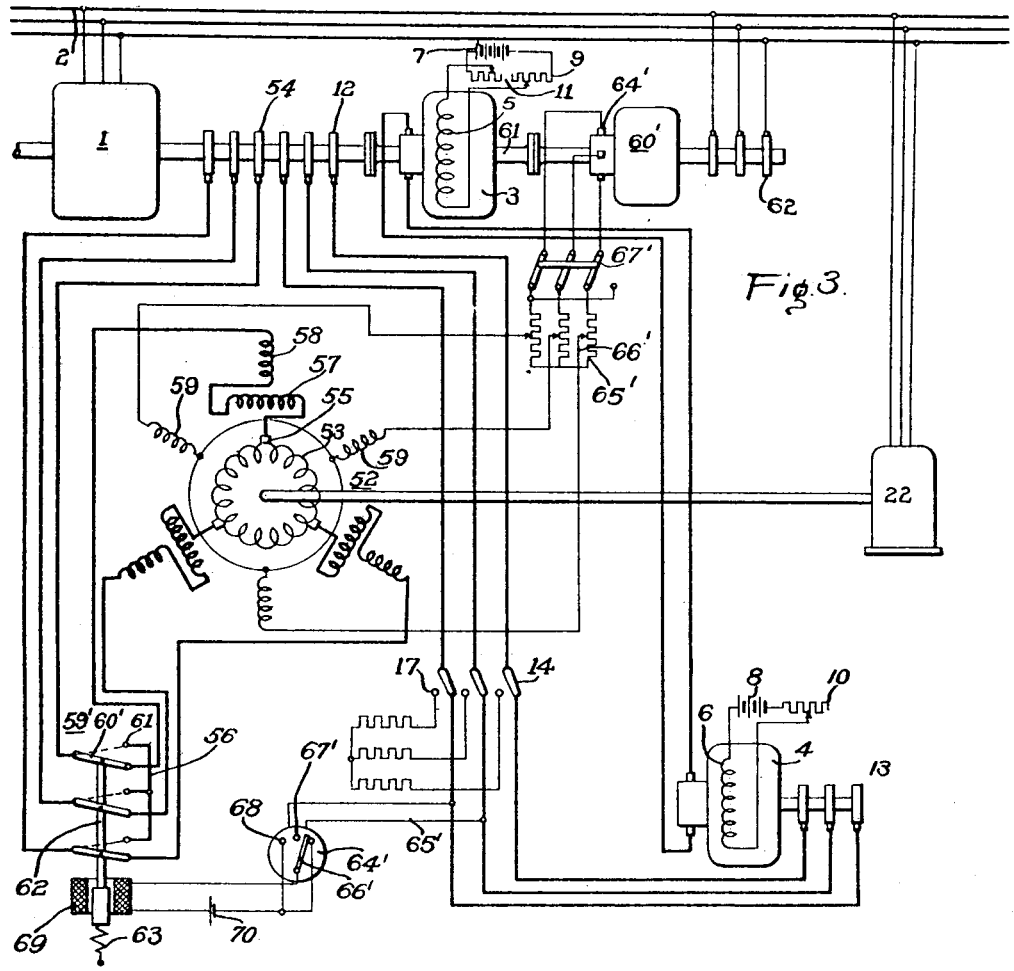
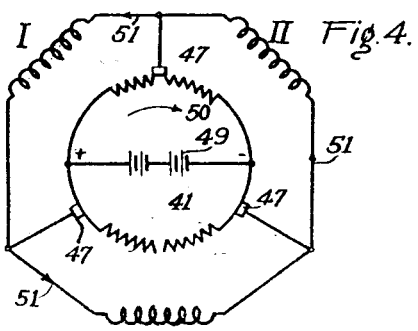
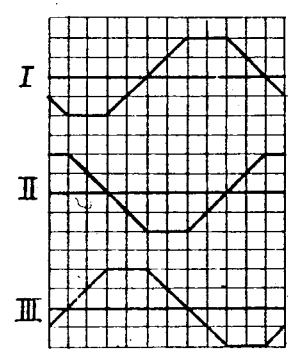

1,637,393

UNITED STATES PATENT OFFICE.

ERROL B. SHAND, OF PITTSBURGH, PENNSYLVANIA, ASSIGNOR TO WESTINGHOUSE ELECTRIC & MANUFACTURING COMPANY, A CORPORATION OF PENNSYLVANIA.

DOUBLE-RANGE VARIABLE-SPEED INDUCTION-MOTOR SET.

Application filed April 21, 1923. Serial No. 633,666.

My invention relates to systems of control for induction motors and particularly to systems where the regulation is effected by the control of the energy exchange between the secondary winding of the induction motor and a direct-current machine.

In motor-control systems of the above-indicated type, the interchange of electrical energy is effected by a rotary converter connected between the secondary member of the induction motor and the direct-current machine, and by reason of the inherent character of such converters, the energy exchange is dependent upon the difference between the input and output frequencies.

As a further limitation, the input energy of the converter must also supply the losses in the converter and the energy necessary to circulate the torque-producing current in the secondary member of the induction motor. While approaching synchronism in the under-synchronous range, the energy generated in the secondary member of the induction motor steadily diminishes and is substantially zero at synchronism. Similarly while approaching synchronism in the over-synchronous range, the energy that the converter supplies to the secondary winding of the induction motor gradually approaches zero. One object of my invention is to provide improved methods and means for stabilizing the operation of a control system, of the type described, in the range near synchronism.

Another object of my invention is to provide means for compensating for the losses in the secondary member of the induction motor.

A still further object of my invention is to provide means whereby the current derived from the direct-current machine, while acting as a generator, may be converted into current of the slip frequency and fed into the secondary winding of the induction motor, during operation near synchronism.

Other features of novelty that characterize my invention will be pointed out in the following description and claims, and are illustrated in the accompanying drawings, wherein—

Figures 1, 2 and 3 are diagrammatic views of different embodiments of my invention.

Figs. 4 and 5 are explanatory diagrams, hereinafter described in detail.

In Fig. 1 are shown the essential pieces of apparatus used in one embodiment of my invention. A main induction motor 1 is fed from a three-phase alternating-current supply circuit 2 and drives a load not shown in the drawing. A direct-current machine 3 is mechanically coupled to the induction motor and is electrically connected to a synchronous converter 4. Both the direct-current machine 3 and synchronous converter 4 have field windings 5 and 6, respectively, excited from suitable sources 7 and 8, through rheostats 9 and 10. The rheostat 9 is of the reversing type, in order that the excitation of direct current machine 3 may be reversed as desired.

The connection between the slip-rings 12 of the secondary member of the induction motor 1 and the slip-rings 13 of the synchronous converter 4 may be accomplished through switches 14 and 15, when occupying their illustrated positions. A variable polyphase rheostat 16 is connected to a second set of contact members 17 of the switch 14 and may be used for starting the induction motor 1.

By controlling the excitation of the direct-current machine 3, the desired regulation may be effected in a well-known manner in both the under-synchronous and over-synchronous range; but, as explained above, the regulation of the set would fail in the range near synchronism. To overcome this difficulty switch 15 is provided with a second set of contact members 18, by means of which a three phase series "booster" 19 may be connected between the secondary winding of the induction motor and the rotary converter slip-rings 13.

The "booster" may comprise for each phase a rotor member 20 of the commutator type and a stator member having a compensating winding 21 and an exciting winding 21ª. All three rotor members are mounted on the same shaft and driven by an auxiliary induction motor 22, which is energized from the supply circuit 2. The speed of the auxiliary induction motor may be varied by shifting contact members 23 on a polyphase rheostat 24, to which the secondary member of the motor 22 is connected.

The voltage generated by such a "booster" is dependent upon the current flowing through the exciting field winding, in this case upon the current in the secondary winding of the main induction motor 1 and upon the speed at which the "booster" is driven. The "booster" action is independent of the frequency of the current traversing its windings, but may be made responsive to the frequency, if desired, by shifting the brushes from their neutral position.

If the conditions in the induction motor 1 when in the under-synchronous range are considered, it will be found that the voltage of slip frequency generated in the secondary member of the induction motor is composed of two components: the ohmic drop component, corresponding to the IR drop caused by the current necessary to supply the torque of, and the energy consumed by, the rotary converter, and the reactive component which is proportional to the current and the slip frequency. With decreasing slip, the reactive drop approaches zero, while the ohmic drop decreases to a certain minimum voltage determined by the current which, in connection with the field flux, produces the torque in the induction motor. Therefore, if the speed of the rotary members 20 of the "booster" is adjusted by means of the polyphase resistor 24 of the driving motor 22 to supply that minimum voltage, the set becomes stable over the whole speed range, including synchronism.

As the "booster" has to supply only a small fraction of the power of the set and that only for short intervals, it may be of relatively small size and cost. The "booster" may, however if desired, remain connected in the circuit during the entire operation of the set.

In operation, the "booster" 19 is always connected in the circuit at a speed near synchronism. When passing from a speed under synchronism, the excitation of the direct-current machine 3 is at first reduced to zero. The IR drop in the secondary of the induction motor 1 is then supplied by the "booster" and the induction motor runs at synchronism, the rotary converter 4 being at standstill. With the direct current machine 3 excited in the reverse direction and operating as a generator, the rotary converter 4 is then started in the opposite direction to generate an alternating voltage which, added to the voltage generated by the "booster", brings the induction motor 1 above synchronism. The operation from above to under synchronism is quite similar, except that the sequence of the excitation of the direct current machine is reversed.

The induction motor set shown in Fig. 2 contains the same main units as that shown in Fig. 1, but I use a different method of control during the critical range of synchronism. By means of a 5-pole switch 25 an auxiliary machine 26 is connected into the circuit, instead of the rotary converter.

The machine 26 may be driven by means of a differential gear device 27, at a speed corresponding to the slip frequency.

The differential gear device 27 comprises a bevel gear wheel 28, which is mounted on the shaft 29 of the main induction motor 1, a combination gear-wheel 30 embodying a bevel gear-wheel 31 and spur gear-wheel 32, which are mounted loosely on a shaft 33 of a separately driven synchronous motor 34, and a similar bevel gear-wheel 35 which is in mesh with the bevel gear-wheels 28 and 31 and has a shaft 36 mounted loosely in a bearing 37. The bearing is secured to the end of the shaft 33 of the synchronous motor 34 and has its axis disposed perpendicular to said shaft. The auxiliary synchronous motor has twice as many poles as the main induction motor 1 and has a synchronous speed equal to half the synchronous speed of the induction motor. The shafts of the main motor and of the synchronous motor are shown in alinement.

With both motors 1 and 34 running at their synchronous speeds and in the same direction, no movement is imparted to the spur gear-wheel 32, the synchronous speed of the induction motor 1 being twice the speed of the auxiliary motor 34. But with the main motor 1 running at "slip speed" the gear-wheel 32 will run at a speed corresponding to the slip frequency, in one direction during positive slip and in the opposite direction during negative slip. By means of a second gear-wheel 38, which meshes with the gear-wheel 32, the rotation thereof is transmitted to a shaft 39, upon which is mounted the rotating member 40 of the above mentioned auxiliary machine 26.

The rotating member is shown comprising a rotor member or circular body member 41, four rheostat elements 42, and two conducting elements or conducting strips 43. Each rheostat element 42 corresponds to an arc of 30 degrees and each conducting element to an arc of 120 degrees of the circumference of the circular body 41, the several elements are so mounted upon said circumference that each conducting element 43 is connected to two rheostat elements 42, with an open connection between each pair of adjacent rheostat elements. The conducting elements 43 may be connected through slip-rings 44, brushes 45, and contact members 46, of the switch 25, to the direct current machine 3 acting as a generator. Three brushes 47 having a relative displacement of 120 degrees co-operate with the circular body 41 and are connected through contact members 48 of the switch 25 to the secondary winding of the induction motor 1.

The operation of the auxiliary machine 26 may be best explained by means of Figs. 4 and 5. Fig. 4 represents, in a schematic way, an auxiliary machine as described above, but with a battery 49 utilized to indicate the direct-current supply and coils I, II and III, connected between the brushes 47, to represent the secondary windings of the induction motor 1. Fig. 5 is a diagram representing the value of current in the coils I, II and III as a function of time, taking as a time unit, 1/12 of a full rotation of the circular body 41. With the rotor turning in the direction indicated by the arrow 50, and considering the current direction indicated by the arrow 51 as positive, the upper curve represents the current in the coil I, the middle curve, the current in the coil II, and the lower curve, the current in the coil III. The incoming direct-current is thus changed into an alternating three-phase current corresponding to a polyphase supply. As the frequency of this polyphase source of supply is exactly equal to the slip frequency, this source may be used to supply the secondary winding of the induction motor 1 during the range near synchronism. In operation the auxiliary machine 26 is connected in the circuit in the range near to synchronism, either manually or by means of a standard frequency-responsive relay such as that hereinafter described in connection with Fig. 3, when the direct-current machine 3, acting as a generator, cannot supply the current necessary to operate the induction motor by means of the synchronous converter 4.

The phase angle of the currents supplied by the auxiliary machine 26 may be varied at will by shifting the brushes 47 in a circumferential direction, and the torque of the induction motor 1 as well as its speed may be thereby controlled.

The desired action of the auxiliary machine 26 may be obtained in many other ways; its essential characteristic is the use of resistor elements in connection with synchronous commutating means in order to supply energy for the operation of induction motors.

Fig. 3 is an embodiment of my invention corresponding to that shown in Fig. 1, but with another type of "booster" and additional means for regulating the excitation of the booster.

The "booster" 52 comprises a three phase rotary member having a winding and a commutator 53. The stator has, for each phase, a compensating winding 57 and a series exciting winding 58 connected by means of three brushes 55 to the commutator 53. The stator is also provided with an independent star-connected exciting winding 59 that is supplied from an exciter 60, which is coupled to the main shaft 61 of the induction motor 1. The exciter 60 for the "booster" 52 is of the common frequency-changer type and has a suitable winding connected through slip rings 62 to the main supply circuit 2, and a commutator supplying, by means of brushes 64, a polyphase current of the slip frequency to a polyphase rheostat 65. Any desired voltage may be secured from said rheostat by means of movable contact members 66. By means of a switch 67 two phases of the polyphase rheostat 65 may be interchanged and the direction of the polyphase supply to the "booster" 52 thus reversed.

The secondary member of the induction motor is phase wound and each phase is connected to a pair of slip rings 12 and 54. One set of slip rings 12 leads to a three-blade switch 14 and may be connected either to a polyphase rheostat 16 when the switch blades engage contact members 17 or, when occupying the position illustrated in the drawing, directly to the slip rings 13 of the rotary converter 4. The other set of slip rings 54 is connected to a switch 59'.

The switch 59' is shown as comprising three switch blades 60'. When the switch blades 60' engage the upper contact members 61, the three slip rings 54 are connected to a short-circuiting loop 56, which constitutes the neutral point of the star-connected secondary windings of the induction motor 1. When occupying the position illustrated in the drawing, the switch levers 60' connect the "booster" 52 in series with the secondary member of the induction motor 1. The switch blades 69 are adapted to be operated by means of a connecting rod 62, and are normally maintained in the illustrated lower position by a tension spring 63.

A frequency indicating relay 64' of a familiar type is connected to one phase of the secondary member of the induction motor 1 by means of a pair of conductors 65', and is arranged so that at frequencies higher than a predetermined value, a lever 66' is deflected from its zero position indicated by the reference character 67' and brought into engagement with the one or the other of two contact members 68, thereby closing a circuit including the actuating coil 69 of the switch 59' and a source of potential 70. The coil 69 is arranged to act in opposition to the tension spring 63 so that during operation at frequencies larger than the predetermined value both above and below synchronism the secondary winding of the induction motor is connected directly to the neutral point 56. With this connection, the rotary converter 4 and the secondary winding of the induction motor are connected in series and may be controlled in the usual manner by variation of the excitation of the direct current machine 3. In the range near synchronism, the "booster" 52 is connected into the neutral point of the circuit and the control is effected in a manner similar to that described in connection with Fig. 1, but with the additional provision of means for controlling the voltage generated in the "booster" 52 by varying the current in the additional exciting winding 59.

In like manner, a frequency-responsive relay 71 may be connected to the secondary circuit of the motor in the apparatus shown in either of the two first-described embodiments of my invention, as shown, for example, in Fig. 2. At frequencies above a predetermined small slip frequency, a relay switch-arm 72 closes a circuit, energizing a solenoid 73 from an electrical source 74. Within the solenoid 73 is shown an armature 75 which is mechanically connected to the five-pole switch 25 to move it to its normal position which it occupies at all times, except during the transition-stage in passing through synchronism. When the slip frequency falls below the predetermined amount, the solenoid 73 is deenergized and a spring 76 moves the five-pole switch to bring the auxiliary machine 26 into play.

I have shown the booster 52, in Fig. 3, driven by a separate driving motor 22, but I may obviously couple it directly to the main motor 1 or drive it in any other suitable manner.

Many other variations and modifications of my invention will be evident to those skilled in the art, and accordingly, I do not wish to be limited to the exact arrangements herein shown and described, but I desire to cover, in the appended claims all those modifications which come within the scope and spirit thereof.

I claim as my invention:

1. In a variable-speed drive, the combination of an induction motor, a direct-current machine, a dynamo-electric current-converting machine connected between the secondary member of said induction motor and said direct-current machine to control the speed of said induction motor, said current-converting machine being unstable within the range near synchronous speeds, and means responsive to low-frequency currents in said secondary member for including in the circuit between said induction motor and said direct-current machine auxiliary means securing stable operation of the set over the range near synchronism.

2. The combination with an induction motor, of a rotary converter and a direct-current machine concatenated in series relation, means for controlling the energy flow in said direct-current machine, an auxiliary machine, and means for connecting said auxiliary machine in series with the secondary member of the induction motor and for substituting said machine for said rotary converter, during a predetermined speed range near synchronous speed while said direct-current machine is acting as a generator, said auxiliary machine being capable of converting the current supplied from said direct-current machine into a current of the proper frequency to carry the induction motor over the double range near synchronism.

3. The combination with an induction motor, of a rotary converter and a direct-current machine concatenated in series relation, means for controlling the energy flow in said direct current machine, and means for connecting an auxiliary machine to the secondary member of the induction motor and substituting said auxiliary machine for said rotary converter during a predetermined speed range near synchronous speed, while said direct-current machine is acting as a generator, said auxiliary machine comprising a rotor member embodying four rheostats and two conducting elements, each rheostat element corresponding to approximately 30° and each conducting element to approximately 120° of the circumference, said conducting elements being connected to two adjacent rheostat elements, two slip rings connected to the two conducting elements of said rotor member, three brushes, having a relative displacement of 120°, co-operating with said rotor member and connected to the secondary member of said induction motor, two brushes co-operating with said slip rings and connected to said direct-current machine and means for driving said rotor member at a speed corresponding to the slip frequency of the induction motor.

4. The combination with an induction motor, of a rotary converter and a direct-current machine concatenated in series relation, means for controlling the energy flow in said direct-current machine, an auxiliary machine, and means for connecting said auxiliary machine in series relation with the secondary member of the induction motor and for substituting said machine for said rotary converter during a predetermined speed range near synchronous speed while said direct-current machine is acting as a generator, said auxiliary machine comprising a plurality of resistor elements and conducting elements controlled in accordance with the slip of said induction motor to convert the current supplied from said direct-current machine into a current of the proper frequency to carry the induction motor over the range near synchronism.

In testimony whereof, I have hereunto subscribed my name this 12th day of April 1923.

ERROL B. SHAND.